Patented Sept. 3, 1940

2,213,555

UNITED STATES PATENT OFFICE 2,213,555

PROCESS FOR PRODUCING CALCIUM SULPHATE-ZINC SULPHIDE PIGMENTS

Roy William Sullivan, Cragmere, Del., assignor to E. I. du Pont de Nemours & Company, Wilmington, Del., a corporation of Delaware No Drawing. Application October 21, 1937, Serial No. 170,221

4 Claims. (Cl. 134—78)

This invention relates to the manufacture of composite calcium sulphate-zinc sulphide pigments, and more particularly to a process for obtaining said pigments by precipitation from solutions containing calcium and sulphide ions.

More specifically, the invention has reference to the provision of an economical and simple method for producing calcium base lithopone pigments from calcium chloride solutions by reacting said solutions with a soluble sulphide and zinc salt, and at the same time inherently avoiding the redissolving of the calcium sulphate formed or precipitation of calcium sulphide.

The difficulties heretofore encountered in the production of calcium sulphate-zinc sulphide pigments have been due mainly to the insolubility of calcium sulphide in aqueous solvents. In this respect, such processes are essentially different from common processes for producing barium lithopone pigments, where the corresponding barium sulphide is readily soluble in water and where solutions of zinc sulphate can thus be allowed to react with solutions of barium sulphide. Because of the diverse properties of barium sulphide, as compared with calcium sulphide, processes for the production of barium lithopone are not interchangeable with or adapted to the production of calcium lithopone. Thus, barium sulphide solutions of high concentration, e. g., several hundred grams BaS/1, are readily prepared by leaching barium black ash, a product obtained by thermal reduction of barytes. On the other hand, calcium sulphide obtained in similar manner by furnacing calcium sulphate is practically insoluble in water and impure solutions containing only about 3 g. CaS/1 are attainable. Furthermore, barium sulphate is practically insoluble and does not precipitate in the hydrated form. When precipitated in the conventional manner as a constituent of barium lithopone there is no appreciable tendency for particle size growth even on long continued standing in aqueous media. However, calcium sulphate precipitates in the form of the dihydrate and is over 12,000 times as soluble as barium sulphate. Additionally, the particles of calcium sulphate tend to grow rapidly to such large proportions that they become unsuited for pigments.

As is well-known, the value of pigments and extenders is dependent upon particle size which influences to a great extent the tinting strength, hiding power and oil absorption properties of the pigment. Particle size of both the prime pigment and the extender portion of a composite pigment is also an important factor in the obtainment of good film fineness, gloss, and other paint film properties. Similarly, good color is an important requisite for a marketable white pigment.

I have found that all of these desirable attributes inherently result from a practice of my invention.

I have also found that calcium sulphide is not precipitated from solutions of a calcium salt and ammonium sulphide, and that the $CaSO_4$ formed will not be subject to redissolution to any appreciable extent. Accordingly, the preferred embodiment of my invention comprises reacting a solution containing available zinc and sulphate ions with an aqueous solution containing ammonium sulphide and a soluble calcium salt, as a result of which a co-precipitated calcium sulphate and zinc sulphide pigment is obtained. I have found further that the precipitated calcium sulphate of my process is very fine in particle size, contains no acicular gypsum crystals, and is eminently useful as an extender for the zinc sulphide. Seemingly, a restraining influence is exerted upon the particle size of the calcium sulphate, due to adsorption of calcium or sulphate ions present in the zinc solution.

In the preferred embodiment of my invention, I add to a solution of ammonium sulphide any desired amount of calcium chloride, calcium nitrate or other soluble calcium salts obtained from an acid having radicals which form soluble salts with zinc, and employ this mixture to obtain a co-precipitated calcium base lithopone pigment. To the ammonium sulphide-calcium salt solution, I add a solution containing available zinc and sulphate ions, as a result of which interaction between the zinc and sulphide ions and the calcium and sulphate ions occurs. After precipitation and alkalinity adjustment, the composite zinc sulphide and hydrated calcium sulphate precipitate is filtered and washed and is then heat treated to develop pigment properties and comminuted by grinding or disintegration in the well-known manner.

An additional advantage afforded by the invention is the employment of ammonium sulphide as the zinc sulphide precipitant permitting recovery of the ammonium chloride for reuse in the process, and consequently a method is afforded in which a cyclic operation results.

My novel process is illustrated by means of the following chemical equations:

1. $ZnSO_4 + CaCl_2 \rightarrow ZnCl_2 + CaSO_4$
2. (a) $ZnCl_2 + (NH_4)_2S \rightarrow ZnS + 2NH_4Cl$
   (b) $2NH_4Cl + Ca(OH)_2 \rightarrow CaCl_2 + 2NH_4OH$
   (c) $2NH_4OH + H_2S \rightarrow (NH_4)_2S + 2H_2O$ A suitable modification of the foregoing process involves reaction of the zinc solution directly with the solution containing both calcium and sulphide ions. For instance, crude calcium sulphide may be leached under pressure at elevated temperatures with ammonium chloride solution and the clarified solution containing calcium chloride, ammonium and sulphide ions, may then be reacted with a zinc solution containing the sulphate ion in necessary amount. This modification also involves a cyclic operation and is readily understandable from the following equations:

3. (a) $ZnSO_4 + (CaCl_2 + (NH_4)_2S) \rightarrow ZnS + CaSO_4 + 2NH_4Cl$
(b) $CaS + 2NH_4Cl \rightarrow (NH_4)_2S + CaCl_2$ The composite precipitate consisting of zinc sulphide and calcium sulphate formed as represented by Equation 3(a) is filtered, washed and heat treated to develop pigment properties.

The ammonium chloride formed according to Equation 3(a) is used to leach calcium sulphide to prepare further quantities of a solution containing the necessary calcium, chloride, ammonium and sulphide ions (Equation 3(b)) to be again used according to Equation 3(a).

In order that my improved process for obtaining composite co-precipitated zinc sulphide-calcium sulphate pigments may be more clearly understood, the following specific examples are given, none of which are to be considered as in any wise limiting the scope of the invention:

*Example I*

1350 vols. of zinc sulphate solution of 39° Baumé (equivalent to 528.6 parts by weight of zinc sulphate) were mixed with 196 vols. of $ZnCl_2$ solution of 50° Baumé (equivalent to 128.5 parts by weight of $ZnCl_2$) and the mixture placed in an ordinary strike tank equipped with an agitator. Ammonium sulphide-calcium chloride liquor obtained by leaching calcium black ash with $NH_4Cl$ solution, containing 132 g. $(NH_4)_2S$ per liter and 240 g. $CaCl_2$ per liter, was allowed to flow into the zinc liquor at room temperature, and while the reaction mixture was subjected to agitation. The addition of the ammonium sulphide-calcium chloride liquor was stopped when the slurry showed a moderate sulphide test with nickel sulphate. This is usually at about a pH of 6.5. The raw pigment was subjected to filtration and washing for removal of water-soluble salts, chiefly ammonium chloride. In order to reduce the quantity of wash water, which it will be necessary to evaporate in order to recover ammonium chloride (for use in preparing more $(NH_4)_2S-CaCl_2$ solution), it is desirable to have the original zinc or ammonium sulphide-calcium chloride liquors of high concentration. Zinc liquor as high as 45° Baumé is conveniently worked with when the ammonium sulphide-calcium chloride liquor contains about 13% ammonium sulphide, as above. After washing free from water-soluble salts, the pigment is ready for drying and calcination in the customary manner. In case the pH of the raw press cake is below 7, it might be desirable to add a small quantity of sodium hydroxide or sodium sulphide to the last wash water.

After calcination, the resultant pigment on analysis was found to contain 47.84% zinc sulphide and 51.62% calcium sulphate. The pigment was of excellent color, grading .15, and showed a tinting strength of 164, which is very excellent considering the zinc sulphide content.

The color and tinting strength figures given above, as well as those hereinafter set out, were determined in accordance with the methods described by Booge and Eastlack on page 11 of the April 16, 1924, issue of "Paint, Oil and Chemical Review." A color grading as low as 10 under the arbitrary scale there employed constitutes a commercially saleable pigment.

*Example II*

To 1546 parts by volume of a purified zinc liquor containing 181.5 g. Zn, 225.2 g. $SO_4$ and 43.2 g. Cl per liter were added, during efficient agitation of the reaction mass, sufficient calcium chloride solution free of objectionable impurities, to precipitate the $SO_4$ content of said zinc liquor.

To the reaction mass resulting from the above operation were added, likewise with efficient agitation, 2160 parts by volume of an ammonium sulphide solution containing 190 g. $(NH_4)_2S/L$.

The composite precipitate was filtered and washed to remove a considerable portion of the $NH_4Cl$ therefrom.

The recovery of $NH_4Cl$ was equivalent to 90.2% of the $(NH_4)_2S$ used.

The composite precipitate was then dried to low moisture content (5 to 10%) and was calcined in a non-oxidizing atmosphere.

When so calcined at 775° C. a composite zinc sulphide-calcium sulphate pigment containing 47.84% ZnS and 51.16 $CaSO_4$ resulted. The tinting strength of this product measured 160, a very satisfactory value for this zinc sulphide content. Color graded 17, an exceptionally high grade product with respect to color.

*Example III*

To a purified zinc solution consisting of 1800 parts by volume of 45° Bé. zinc sulphate and 265 parts by volume of 50° Bé. zinc chloride was added, during efficient agitation, 2910 parts by volume of a solution consisting of ammonium sulphide and calcium chloride.

The solution consisting of ammonium sulphide and calcium chloride contained 130 g. $(NH_4)_2S$ and 240 g. $CaCl_2$ per liter and was obtained by leaching crude calcium sulphide with ammonium chloride solution resulting from the previous batch of the operation. The crude calcium sulphide was obtained by reduction of calcium sulphate with carbonaceous material at elevated temperature.

The precipitate consisting of zinc sulphide and calcium sulphate was filtered and washed with a limited amount of water to recover ammonium chloride for reuse in the process. Ammonium chloride equivalent to 89% of the ammonium sulphide used in the process was recovered.

The precipitate was then further washed, dried to a relatively low moisture content and was calcined in a non-oxidizing atmosphere.

When calcined at 750° C. the resulting composite pigment containing 48% ZnS and 51.57% $CaSO_4$ graded equal to 158 in tinting strength and equal to 16 in color.

While preferably I resort to a co-precipitation process for the production of my improved zinc sulphide-calcium sulphate pigment, wherein ammonium sulphide and a cyclic operation is had which affords the recovery of ammonium chloride for reuse in the process, said composite pigment may also be obtained by employing other alkali sulphides, such as the metallic sulphides of sodium and potassium, to precipitate the zinc sulphide. In the latter event, however, and in order to obtain a commercially satisfactory composite pigment, I have found it necessary to carry out the process by stepwise or successive reactions, and in such manner that the alkali sulphide is not added directly to the calcium chloride. For example, I find it desirable to successively precipitate the calcium sulphate and zinc sulphide, by reacting the zinc solution containing sulphate ions with the calcium chloride solution to precipitate calcium sulphate, and subsequently adding the alkali sulphide to precipitate the zinc as zinc sulphide. Avoidance of direct addition of alkali metal sulphide to the calcium chloride is desirable because when solutions of alkali sulphide and soluble calcium salts are mixed, a precipitate of $Ca(OH)_2$ results. Furthermore, by such successive precipitations, avoidance of the formation of calcium sulphide and soluble calcium sulphate is had. On the other hand, as has been shown, when solutions of ammonium sulphide and calcium chloride are mixed, no precipitate results until the mixture is contacted with the zinc solution, and obviously in such preferred process, the order of addition of reactants is unimportant.

In the instance of such successive precipitations and in order to obtain a commercially satisfactory pigment, I find it necessary to effect a careful control over and regulation of the reactants during precipitating reaction. Thus, in order to obtain a suitable calcium sulfate base of desired and necessary uniformity and particle size average, I find it preferable to maintain the zinc sulphate liquor during reaction with $CaCl_2$ at a pH not to exceed substantially 6.5 and preferably at a pH ranging from 5.5 to 6.2. Again, the liquor concentrations must be maintained relatively constant, as must the temperature, speed of agitation, and rate of reactant addition. In the instance of sodium sulphide use, I find it desirable to maintain the liquor in heated state and between 70–90° C. Similarly, I prefer to employ relatively concentrated solutions of sodium sulphide ranging from 30°–50° Baumé, although the use of relatively dilute concentrations between 4–10° Baumé may be employed. In preferred practice, I find it desirable to avoid variation in concentration beyond 1° Baumé and 5° F. in temperature. As indicated, the limit of variation is merely preferable, and it must be understood that maintaining the concentration uniform at any other point, and within the range of solubility and of temperature within, say, 40–90° C., is permissible.

In conducting the invention in a stepwise manner and under the controlled conditions alluded to, an aqueous solution of zinc sulphate may be treated with an aqueous solution of calcium chloride in substantially molecular proportions. As a result, a calcium sulphate base is precipitated on which zinc sulphide may be precipitated by further addition of a solution of sodium sulphide to the calcium sulphate in zinc chloride solution suspension.

In order that this latter modification of the invention may be more clearly understood, the following specific illustrative example is given:

Example IV

Zinc liquor containing zinc, sodium, sulphate and chloride ions was purified in the usual manner. This zinc solution represented a by-product obtained from the commercial recovery of copper from pyrites subjected to a chloridizing roast. Such a zinc solution may be considered as a mixture of zinc sulphate, zinc chloride and sodium chloride in aqueous solution.

To 40 parts by volume of the aforesaid zinc solution containing 115.06 grams of zinc, 71.24 grams of sulphate and 174.16 grams of chlorine per liter, were added, while thoroughly agitating the same, 6 parts by volume of a purified 54% calcium chloride solution. After precipitation of the available sulphate as calcium sulphate and without removal of such calcium sulphate from the reaction mass there were added, while thoroughly agitating such reaction mass, 25 parts by volume of a 22° Baumé solution of sodium sulphide maintained at a temperature of 75° C.

The addition of such quantity of sodium sulphide solution precipitated all of the zinc as zinc sulphide and resulted, at the end of precipitation, in a slightly alkaline reaction mass.

The precipitate consisting essentially of zinc sulphide and calcium sulphate was then filtered and washed. The resulting washed precipitate was found to contain only traces of chloride.

After heat treating this pigment in an autoclave as described in U. S. Patent #1,977,582 to Hanahan, an excellent zinc sulphide-calcium sulphate pigment was developed having a tinting strength of 254 and color of 16. Such pigment was found by chemical analysis to contain 70.64% of zinc sulphide, the remainder being calcium sulphate.

The above tinting strength grading shows that this pigment with only about 70% of zinc sulphide content compares favorably with commercial zinc sulphide pigments consisting almost entirely of zinc sulphide.

As will be noted from the analyses of my pigment products, the calcium content of such products is substantially such as may be calculated will result when employing zinc solutions of the zinc and sulphate content specified. The only slightly lower than theoretical calcium sulphate content is explained by the normal solubility of calcium sulphate in water. It should also be noted that my process does not necessitate resort to use of addition agents such as alkali sulphates, for the purpose of restraining the solubility of calcium sulphate in the reaction liquors. This is a distinct advantage, because the introduction of sodium salts into the zinc sulphide-containing pigment, to deleteriously act as fritting agents during calcination, is thus avoided.

I claim as my invention:

1. In a process for producing a composite calcium sulphate-zinc sulphide pigment, the step of reacting a zinc sulphate solution with an aqueous solution containing ammonium sulphide and calcium chloride.

2. A process for co-precipitating insoluble calcium sulphate and zinc sulphide to obtain a composite pigment, comprising reacting a solution of zinc sulphate with an aqueous calcium salt solution containing ammonium sulphide.

3. A process for producing a composite calcium sulphate-zinc sulphide pigment, comprising reacting solutions of zinc sulphate with aqueous calcium salt solutions containing ammonium sulphide, while maintaining the reaction mixture at a pH value not exceeding 6.5.

4. A process for producing a composite calcium sulphate-zinc sulphide pigment, comprising reacting a solution of zinc sulphate with aqueous calcium salt solutions containing ammonium sulphide, while maintaining the reaction mixture at a pH value ranging from 5.5 to 6.2.

ROY WILLIAM SULLIVAN.